United States Patent [19]  [11] Patent Number: 4,841,793
Leigh-Monstevens et al.  [45] Date of Patent: Jun. 27, 1989

[54] ELECTRIC SHIFT APPARATUS

[76] Inventors: Keith V. Leigh-Monstevens, 5622 Larkins Dr., Troy, Mich. 48098; Edward L. Tury, 9732 Rosemary La., Brighton, Mich. 48116; David C. Peterson, 855 S. Pontiac Trail, #302, Walled Lake, Mich. 48088; John G. Vanderpoorte, 22476 St. Clair Dr., St. Clair Shores, Mich. 48081

[21] Appl. No.: 95,856

[22] Filed: Sep. 14, 1987

Related U.S. Application Data

[63] Continuation-in-part of Ser. No. 62,775, Jun. 16, 1987.

[51] Int. Cl.⁴ .......................... B60K 20/10; F16H 5/42
[52] U.S. Cl. ..................................... 74/335; 74/336 R
[58] Field of Search ................ 74/335, 336 R, 483 PB

[56]  References Cited
U.S. PATENT DOCUMENTS

| 3,277,734 | 10/1966 | Bernard | 74/335 |
| 4,291,586 | 9/1981 | Buetemeister | 74/335 |
| 4,339,962 | 7/1982 | Babel | 74/335 |
| 4,449,416 | 5/1984 | Huitema | 74/336 R |
| 4,567,969 | 2/1986 | Makita | 74/335 X |
| 4,619,151 | 10/1986 | Trachman | 74/335 |
| 4,664,217 | 5/1987 | Welch et al. | 180/247 |

Primary Examiner—Dirk Wright
Attorney, Agent, or Firm—Krass & Young

[57] ABSTRACT

An electric shift apparatus for use with a motor vehicle having an automatic transmission. The apparatus includes a power module adapted to be mounted on the housing of the transmission proximate the transmission mode select shaft and a control module adapted to be mounted in the passenger compartment of the vehicle. The power module includes an electric motor driving a speed reduction unit and the lower exposed end of the output shaft of the reduction unit is adapted to be drivingly coupled to the exposed upper end of the mode select shaft of the automatic transmission. The control module includes a plurality of push button members corresponding respectively to the transmission shift positions. An encoder wheel positioned in the housing of the speed reduction unit provides a constant coded signal indicating the instantaneous position of the transmission mode select shaft and this coded signal is compared by comparator means in the logic of the control unit with the selected shift position. The comparator means generates a signal to the motor assembly to move the mode select shaft in a direction to achieve the selected shift position and stops the motor assembly when the encoder signal received from the power module matches the selected shift position indicating that the selected shift position has been achieved.

19 Claims, 3 Drawing Sheets

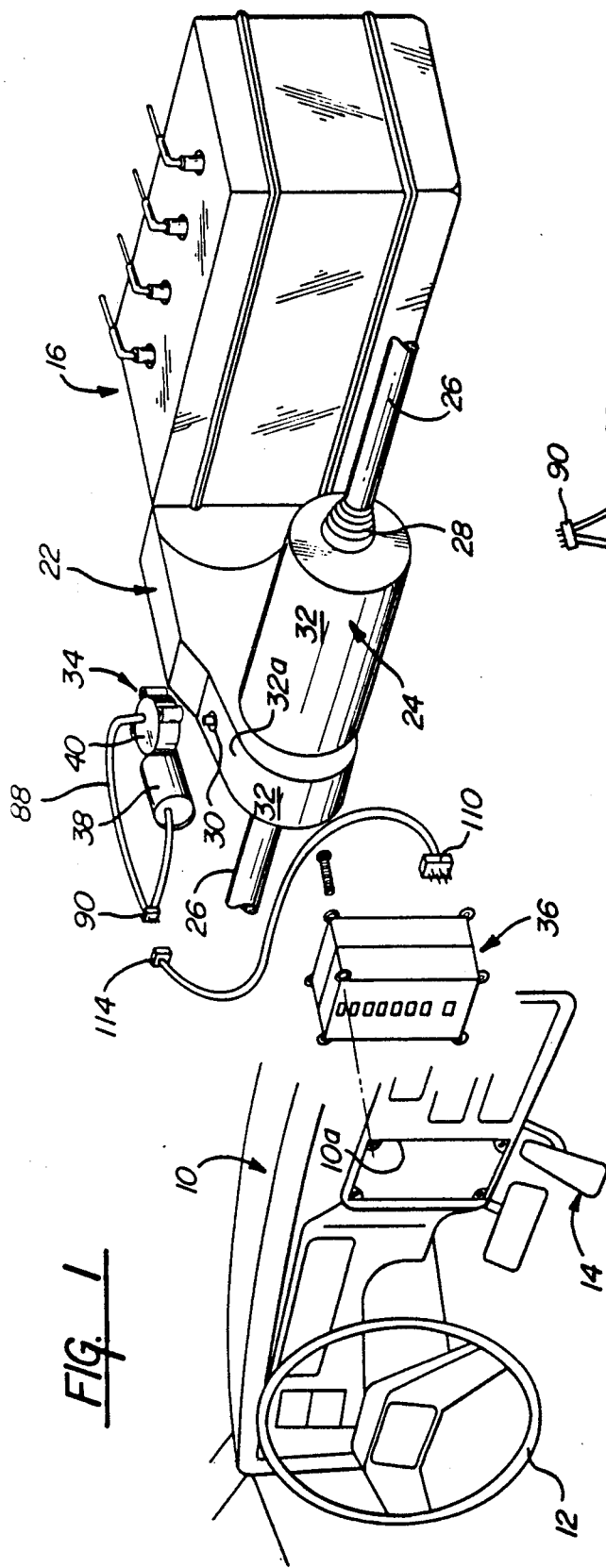
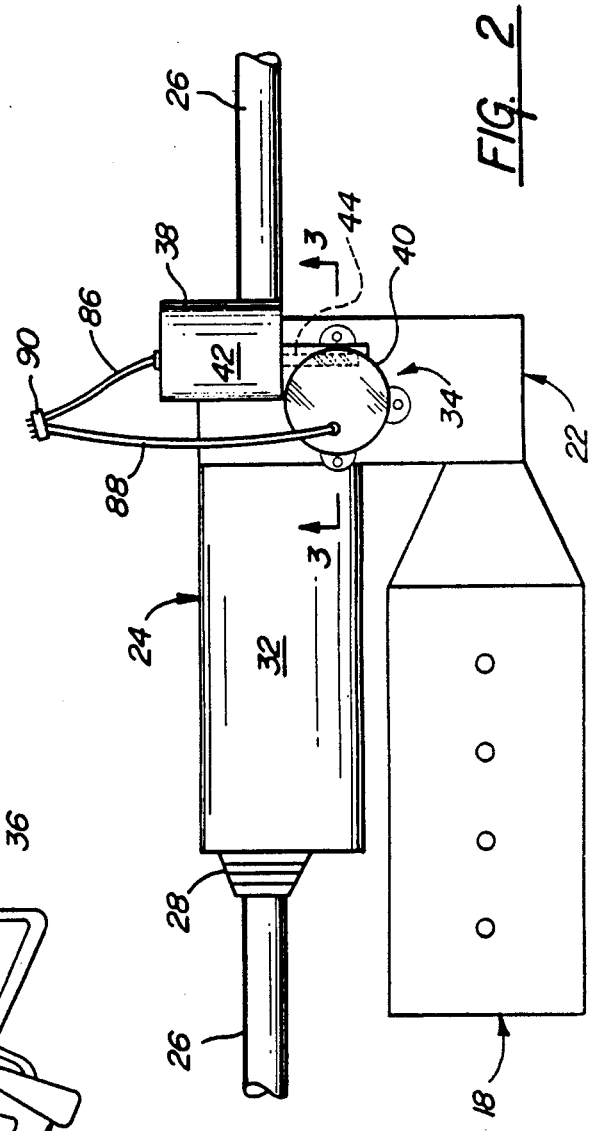
FIG. 1
FIG. 2

ELECTRIC SHIFT APPARATUS

RELATED APPLICATION

This application is a continuation-in-part of United States Patent Application Ser. No. 062,775, filed June 16, 1987.

BACKGROUND OF THE INVENTION

This invention relates to an electric shift apparatus especially suited for use with a motor vehicle having an automatic transmission.

Motor vehicles since their inception have required some manner of gear change mechanism to satisfy the varying torque and speed requirements encountered during the typical duty cycle of a motor vehicle. For many years these gear change mechanisms were manual in the sense that they required an operator input from a shift lever or the like to effect each desired gear change ratio. More recently, so called "automatic" transmissions have become popular in which much of the shifting is done without operator input in response to sensed speed and throttle opening parameters. These automatic transmissions typically include a mode select member on the transmission housing movable between a plurality of selected positions corresponding to a respective plurality of shift modes within the transmission. The mode select member is moved between its several shift positions by a cable or linkage mechanism extending from the mode select member to a suitable gear selector lever located in the passenger compartment of the vehicle. Various proposals have been made in the past to eliminate the mechanical interconnection between the driver operated lever and the mode select member and provide instead an electrical signal generated by a suitable action on the part of the driver and transmitted electrically to some manner of power means arranged to move the mode select member. None of these attempts to provide an electric shift mechanism for an automatic transmission of a motor vehicle have met with any degree of commercial success since they provided a slow or imprecise shifting action, have added significantly to the cost of the vehicle, or have generated excessive warranty and maintenance costs.

SUMMARY OF THE INVENTION

This invention is directed to the provision of an electric shift apparatus for the automatic transmission of a motor vehicle which provides positive and precise shifting, which is amenable to ready installation in the motor vehicle at the time of the original motor vehicle manufacture, and which is reliable in operation even over a long motor vehicle life.

More particularly, this invention is directed to the provision of an electric shift apparatus which is especially with the automatic transmission of a motor vehicle having a front wheel drive.

The invention electric shift apparatus is intended for use with a motor vehicle having an automatic transmission of the type including a mode select shaft having a free end positioned outside of the transmission housing. According to a feature of the invention, the electric shift apparatus includes an electric motor having a housing and an output shaft; a speed reduction unit having a housing secured to the motor housing and having an output shaft driven at a reduced speed in response to rotation of the motor output shaft and having a free end positioned outside of the speed reduction unit housing; means for mounting the motor and speed reduction unit on the transmission housing with the output shaft of the speed reduction unit aligned coaxially with the mode select shaft and the free ends of the shafts juxtaposed; coacting coupling means on the free ends of the shafts operative to drive the mode select shaft in response to rotation of the reduction unit output shaft; and encoder means operative to sense the shift position of the transmission and generate an encoder signal representative of the sensed shift position. This arrangement provides a compact and efficient shift apparatus which functions to effectively drive the mode select shaft of the transmission between its various shift positions and which functions to provide a continuous encoder signal representative of the instantaneous shift position of the transmission.

According to a further feature of the invention, the encoder means includes an encoder wheel mounted on the output shaft of the speed reduction unit. This arrangement provides a convenient means of providing the encoder function.

According to a further feature of the invention, the encoder wheel is positioned within the housing of the speed reduction unit. This arrangement provides a protected environment for the encoder wheel to ensure its reliable and continuous operation.

According to a further feature of the invention, the encoder means includes a pickup device carried by the speed reduction unit housing and arranged to selectively engage code indicia on the encoder wheel as the wheel is rotated in response to actuation of the motor. This arrangement provides a convenient and effective means of generating an encoder signal for transmission to appropriate control mechanisms.

According to a further feature of the invention, the speed reduction unit includes a worm gear on the motor output shaft and a worm wheel on the speed reduction unit output shaft driven by the worm gear and the encoder wheel is secured to a side face of the worm wheel. This arrangement allows the existing worm wheel of the speed reduction unit to serve as the carrier for the encoder wheel to provide an efficient and compact package for the shift apparatus.

According to a further feature of the invention, the shift apparatus further includes a control module and comparator means. The control module is adapted to be mounted in the passenger compartment of the vehicle and includes a plurality of mode select members accessible to the vehicle operator and corresponding respectively to the transmission shift positions, and generator means operative in response to operator actuation of each mode select member to generate an operator signal representative of the selected shift positions. The comparator means receives the encoder signals and the operator signals, operates in response to receipt of an operator signal differing from the received encoder signal to energize the motor assembly in a sense to move the mode select shaft to a position corresponding to the operator signal, and operates in response to the arrival of the mode select shaft in the selected position to deenergize the motor assembly. This arrangement provides a compact and efficient assembly for precisely positioning the mode select shaft of the transmission in response to operator actuation of the mode select members.

BRIEF DESCRIPTION OF THE DRAWINGS

FIG. 1 is a fragmentary perspective view of a front wheel drive motor vehicle embodying the invention electric shift apparatus;

FIG. 2 is a fragmentary plan view of the front wheel drive assembly of the vehicle of FIG. 1;

DETAILED DESCRIPTION OF THE PREFERRED EMBODIMENT

Figure 3:
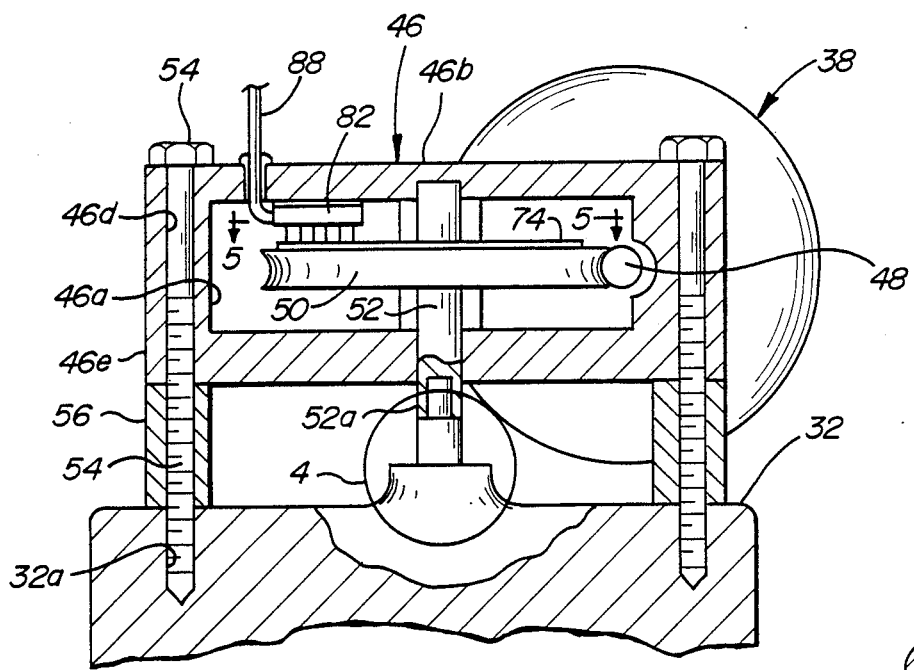
FIG. 3 is a view taken on line 3—3 of FIG. 2.
Figure 4:
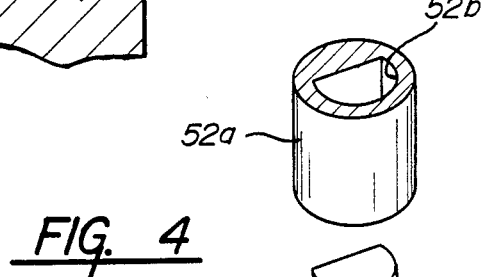
FIG. 4 is a fragmentary exploded perspective view of the structure within the circle 4 of FIG. 3.
Figure 5:
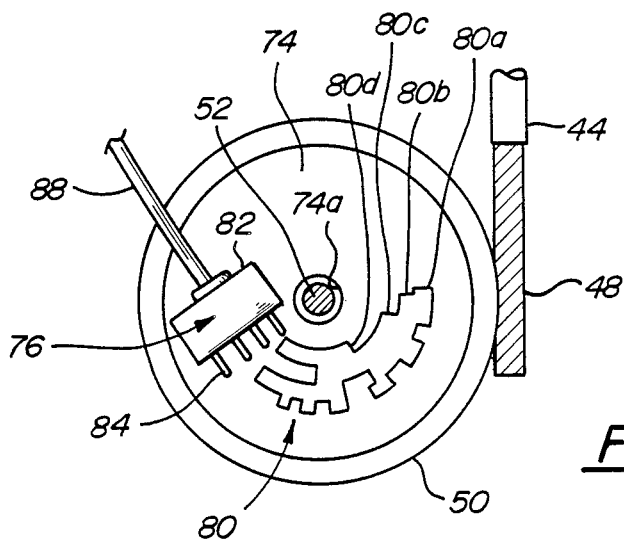
FIG. 5 is a view taken on line 5—5 of FIG. 3.
Figure 6:
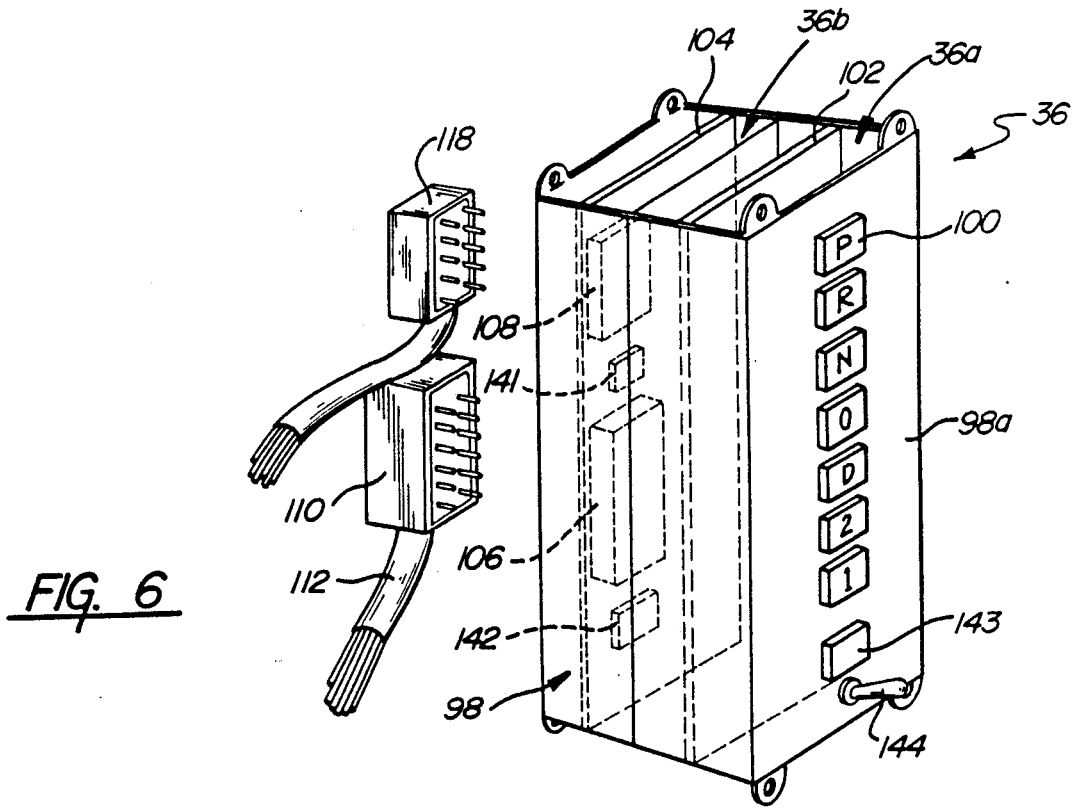
FIG. 6 is a fragmentary perspective view of a control module employed in the invention electric shift apparatus.

The invention electric shift apparatus is seen schematically in FIG. 1 in association with a motor vehicle of the front wheel drive type and including an instrument panel assembly 10 positioned within the passenger compartment of the motor vehicle; a steering wheel 12 associated with the instrument panel; an accelerator pedal assembly 14; and a front wheel drive assembly 16.

Front wheel drive assembly 16 includes an internal combustion engine 18 mounted transversely in the engine compartment of the vehicle, a torque converter 20 driven by engine 18, a gear drive assembly 22, an automatic transmission 24, and drive shafts 26 drivingly connected to the opposite ends of transmission 24 by U joints 28. Transmission 24 includes a mode select shaft 30 having a free upper end positioned above the housing 32 of the transmission 24 and operable in known manner in response to rotation of the shaft to operate internal devices within the transmission to position the transmission in a plurality of transmission modes such as park, neutral, drive, etc.

The invention electric shift apparatus, broadly considered, comprises a power module 34 and a control module 36.

Power module 34 is adapted to be bolted to transmission housing 32 in proximity to mode select shaft 30 and control module 36 is adapted to be positioned in the instrument panel assembly 10 of the vehicle for convenient operator access.

Power module 34 is in the form of a motor assembly and includes a DC electric motor 38 and a speed reduction unit 40.

Motor 38 is a direct current motor having, for example, an output torque rating of 200 inch pounds and includes a housing 42 and an output shaft 44.

Speed reduction unit 40 includes a housing 46 fixedly secured to motor housing 42 and defining an internal cavity 46a, a worm gear 48 formed as a coaxial extension of motor output shaft 44 and extending into cavity 46a, a worm wheel 50 positioned in cavity 46a and driven by worm gear 48, and an output shaft 52 driven by worm wheel 50, journalled in housing walls 46b and 46c, and including a free lower end 52a positioned outside of and below housing wall 46c. Shaft lower end 52a includes a D shaped opening 52b for driving, coupling receipt of the D shaped upper end portion 30a of mode select shaft 30.

Motor assembly 34 is mounted on the upper face of transmission housing 32 by a plurality of bolts 54 passing downwardly through bores 46d in lug portions 46e of reduction unit housing 46 and downwardly through spacers 56 for threaded receipt in tapped bores 32a in transmission housing 32. In assembled relation, reduction unit output shaft 52 is coaxially aligned with mode select shaft 30, and D opening 52b in reduction shaft lower end 52a telescopically receives D shaped upper end 30a of mode select lever 30 so that actuation of motor 38 acts through worm shaft 48, worm wheel 50, and reduction unit output shaft 52 to drive mode select shaft 30.

Power module 34 further includes an encoder assembly 72 operative to sense the instantaneous shift position of the transmission and generate an encoded signal representative of the sensed shift position.

Encoder assembly 72 includes an encoder wheel 74 and a pickup device 76. Encoder wheel 74 may be formed for example of a suitable plastic material and is secured to a side face of worm wheel 50 within reduction unit housing chamber 46a. Encoder wheel 74 includes a central aperture 74a passing speed reduction unit output shaft 52 and further includes code indicia 80 provided on the exposed outer face of the wheel and arranged along four arcuate tracks 80a, 80b, 80c and 80d centered on the center line of the encoder wheel.

Pickup device 76 includes a plastic body member 82 mounting a plurality of flexible resilient contact fingers 84 for respective coaction with indicia tracks 80a, 80b, 80c and 80d. In addition to the four fingers 84 for respective engagement with the four indicia tracks, a fifth finger is provided to provide a ground for the system.

A lead 86 from motor 42 and a lead 88 from pickup device 76 are combined into a pin-type plug 90.

Control module 36 is intended for ready installation in an opening 10a in instrument panel 10 by insertion of the module from the rear of the panel and fastening of the module within opening 10a by the use of several fasteners such as seen at 96. Module 36 includes a housing structure 98 of general box-like configuration enclosing an operator access or push button submodule 36a and a logic submodule 36b.

Push button submodule 30a includes a plurality of push buttons 100 positioned in vertically spaced relation in the front face 98a of the module housing and corresponding to the available transmission shift modes. Specifically, buttons 100 include buttons corresponding to park, reverse, neutral, over-drive, drive, second and first shift positions for the transmission. Buttons 100 coact in known manner with a printed circuit board 102 to generate suitable electrical signals in response to respective depression of the buttons 100.

Logic submodule 36b includes an electronic printed circuit board 104 suitably electrically connected to printed circuit 102 and suitably mounting a first plurality of connector terminals 106 and a second plurality of connector terminals 108. Connector terminals 106 coact with a pin-type plug 110 at the end of a cable 112. Cable 112 includes a plug 114 at its remote end for plugging receipt of plug 90 so that plug 110 embodies the information from leads 86 and 88. Connector terminals 108 coact with a pin-type plug 118. Plug 118 embodies the information from leads 120, 121, 122, 123, 124, and 125.

Lead 120 is associated with a switch 130 sensing the open or closed position of the driver's door of the vehicle; lead 121 is associated with a switch 132 sensing the presence or absence of a driver on the driver's seat of the vehicle; lead 122 senses the open or closed condition of the ignition switch 134 of the vehicle; leads 123 and 124 are connected to the negative and positive terminals of the vehicle battery 135 with a suitable fuse 136 in lead 123; and lead 125 is connected to a speed sensor 137 which provides information with respect to the instantaneous speed which the vehicle is traveling.

The invention electric shift assembly is delivered to the vehicle manufacturer in the form of power module 34 and control module 36. During the assembly of the vehicle, the power module 34 is mounted on the transmission housing 32 in coupling relation to mode select shaft 30 and the control module 36 is mounted in the instrument panel 10, whereafter plug 90 is plugged into plug 114 and plugs 110 and 118 are plugged into control module 36 to complete the assembly of the invention electric shift apparatus.

The mounting of power module 34 on the transmission housing is accomplished simply by positioning the lower end 52a of reduction shaft 52 over the upper end 30a of mode select shaft 30 and passing bolts 54 downwardly through bores 46d and spacers 56 for threaded engagement with tapped bores 32a in transmission housing 32.

Installation of control module 36 in instrument panel 10 is affected simply by moving the control module from the rear of the panel into the opening 10a and fastening the module in place by the use of fasteners 96 or the like. Following the plugging of plug 90 into plug 114 and the plugging of plugs 110 and 118 into connector terminals 106 and 108, the system is operational and ready for use.

Figure 7:
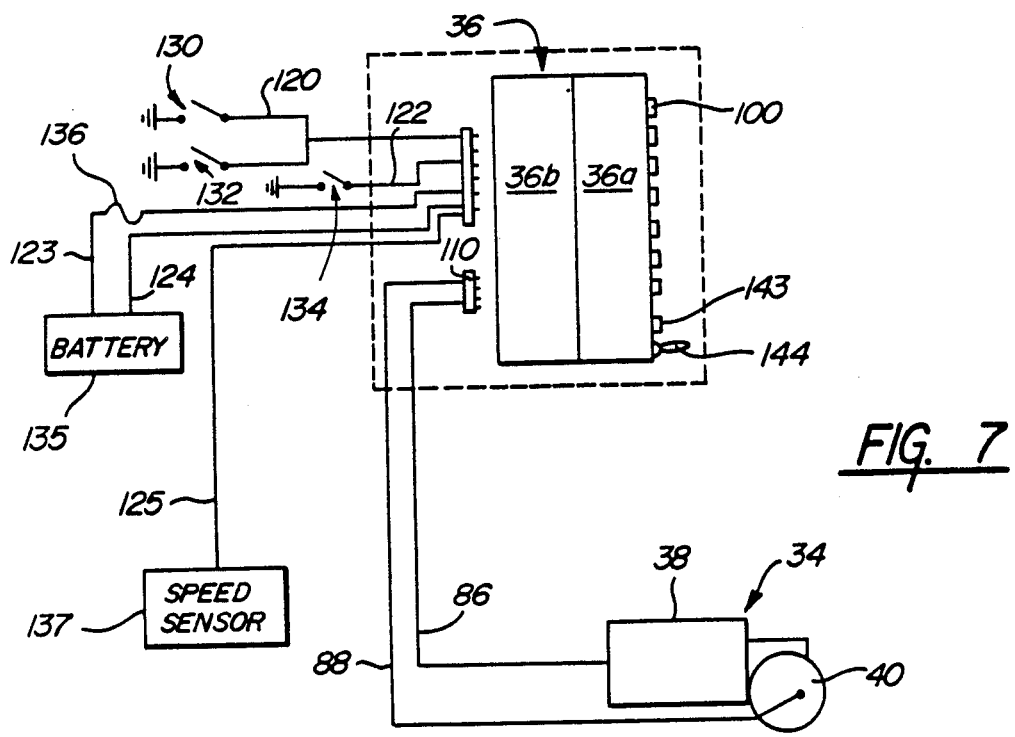
FIG. 7 is a circuit diagram for the invention electric shift apparatus.

In use, various input signals, such as described above and illustrated in FIG. 7, are supplied to a logic chip 141, which may be a programmable logic array or a gate array. Logic chip 141 is configured to receive these input signals and generate the necessary drive signals to motor 38 via a buffer 142 for providing the selection of the desired gear. Firstly, the various input signals are formed into a set of logic signals. These logic signals include a set of signals whose state is selected by the depressed push button 100; PARK, RVRS, NTRL, OVDR, DRVE, LOW1 and LOW2. One of these signals, corresponding to the desired gear selected by the depressed push button is a logic "1" while the other of these signals is a logic "0". Similarly, the encoder signal from encoder assembly 72 permits generation of a set of logic signals PGP, PGR, PGN, PGO, PGD, PGL1 and PGL2, one of which is active to indicate the present gear and the others of which are inactive. The speed sensor input signal is formed into four logic signals: MPH30 indicating a speed of greater than or equal to 3 miles per hour; MPH7 indicating a speed of greater than or equal to 7 miles per hour; MPH20 indicating a speed of greater than or equal to 20 miles per hour; and MPH30 indicating a speed of greater than or equal to 30 miles per hour. Each of these signals is active if their condition is satisfied and inactive if not. Note that these signals are cumulative; if the speed is over 30 miles per hour then all will be active. Additional logic signals include DOOR indicating the opened/closed status of the driver's door, SEAT indicating whether or not the driver's seat is occupied, IGN indicating the status of the ignition switch, and ACC indicating whether or not the accelerator switch 138 is closed.

Logic chip 141 serves to compare the inputs indicating the depressed push button with the inputs indicating the present gear. If they differ, then logic chip 141 generates an output signal to motor 38 to rotate the motor until the present gear matches the selected gear. This process includes an indication of which shifts are upshifts and which are downshifts according to the following Boolean equations:

| | |
|---|---|
| UP1 = | PGL1 |
| UP2 = | PGL2 and Not(LOW1) |
| UP3 = | PPD and (Not (LOW2) and Not(LOW1)) |
| UP4 = | PGO and (NRTL or RVRS or PARK) |
| UP5 = | PGN and (RVRS or PARK) |
| UP6 = | PGR and PARK |
| UPSHFT = | UP1 or UP2 or UP3 or UP4 or UP5 or UP6 |
| DNSHFT = | Not(Not(UPI) and Not(UP2) and Not(UP3) and Not(UP4) and Not(UP5) and Not(UP6)) |

Thus an upshift is required if the present gear is low1 (UP1), or the present gear is low2 and low1 is not requested (UP2), or the present gear is drive and neither low1 nor low2 are requested (UP3), or the present gear is overdrive and either neutral, reverse or park is selected (UP4), or the present gear is neutral and either reverse or park is selected (UP5), or the present gear is reverse and park is selected. A down shift is requested if none of the intermediate states are satisfied.

Two motor control signals SHFTUP and SHFTDN are generated when the signals ENABLE and OK2SHFT are active and the respective UPSHFT or DNSHFT is active and shown below.

SHFTUP=ENABLE and UPSHFT

SHFTDN=ENABLE and DNSHFT

The ENABLE signal generally requires the desired gear to differ from the present gear and certain safety conditions to be satisfied. As shown below, ENABLE is inactive when the desired gear is the same as the present gear.

| | |
|---|---|
| ENABLE = | GOLOW1 or GOLOW2 OR GODRVE or GOOVDR or GONTRL or GORVRS or GOPARK |

These intermediate signals are formed as follows:

| | |
|---|---|
| GOLOW1 = | LOW1 and Not(PGL1) and Not(MPH30) |
| GOLOW2 = | LOW2 and Not(PGL2) and Not(MPH20) |
| GODRVE = | DRVE and Not(PGD) |
| GOOVDR = | OVDR and Not(PGO) |
| GONTRL = | NTRL and Not(PGN) |
| GORVRS = | RVRS and Not(PGR) and Not(MPH7) |
| GOPARK = | (PARK and Not(PGP) and Not(MPH3)) or (((Not(IGN) or (Not(DOOR) and Not(SEAT))) and Not(PGN) and Not(MPH3))) |

Thus the logic chip 141 does not permit a shift into low1 when the speed is in excess of 30 miles per hour, and likewise does not permit a shift to low2 if in excess of 20 miles per hour, to reverse if in excess of 7 miles per hour, and to park if in excess of 3 miles per hour. The second term in GOPARK automatically shifts to park if the ignition is switched off (Not(IGN)), or if the door is opened (Not(DOOR)) and the seat is empty (Not(SEAT)), the driver's seat empty, and the speed is not greater than 3 miles per hour.

As soon as the instantaneous encoder signal transmitted by pickup device 76 matches the signal generated by the specific depressed push button, the comparator logic of control module 36 functions to deenergize and brake the motor so that the mode select shaft 30, and thereby the transmission, is stopped precisely in the selected shift position.

The invention system also preferably includes illumination means for the push buttons 100 with the intensity of the illumination controlled by the usual dash dimmer and with the button corresponding to the selected gear being illuminated brighter than the remaining buttons to provide a ready indication of the instantaneous position of the transmission. An override push button 143 is also provided as a part of push button submodule 36a. Override push button 143 allows the selection of the neutral shift position when it is necessary for the seat to be empty and the vehicle to be in neutral, for example, during vehicle tune-up, vehicle car wash, et cetera.

The system also preferably includes a limp home switch 144 as part of the push button submodule 36a. Limp home switch 144 is arranged to manually jog motor 38 in the event of a system malfunction to enable the vehicle to be driven home or to a repair facility.

The invention electric shift apparatus will be seen to have many advantages. Specifically, the two modular assemblies minimize components and inventory requirements; the ease of assembly of the modules minimizes assembly plant labor; the power and control modules may both be pretested prior to delivery to the vehicle manufacturer with consequent improvements in reliability and warranty costs; noise and vibration from the power train to the passenger compartment is substantially minimized; the awkward and intruding gear select lever is eliminated in favor of attractive flush-mounted push buttons in the instrument panel of the vehicle; and several important safety and convenience features are provided such as automatic shifting to park when the ignition is shut off; automatic prohibition of shifts that would be inappropriate in view of the sensed vehicle speed and direction, and automatic movement of the transmission to park in the event that the driver opens the door and leaves the seat with the engine running and the transmission in a position other than park. The invention electric shift apparatus thus provides many comfort, convenience, and safety advantages as compared to existing transmission control systems and yet may be provided at a cost that is competitive with the existing systems and with projected maintenance and warranty costs less than the existing systems. The invention electric shift apparatus is also especially suitable for use with vehicles employing the increasingly popular front wheel drive configuration since the invention power module readily and efficiently couples with the exposed upper end of the mode select shaft of the automatic transmission construction employed in front wheel drive vehicles.

Whereas preferred embodiments of the invention have been illustrated and described in detail it will be apparent that various changes have been made in the disclosed embodiments not departing from the scope or spirit of the invention.

We claim:

1. In a motor vehicle of the type comprising a body, an engine positioned within said body, drive wheels, and drive means interconnecting said engine to said drive wheels, the improvement wherein said drive means comprises:

(A) an automatic transmission drivingly connected to said engine and including a mode select member for selectively shifting the transmission between a plurality of shift positions including neutral reverse, park and a plurality of forward speed positions;

(B) an electric motor having a housing and an output shaft;

(C) a speed reduction unit having a housing secured to said motor housing and having an output shaft driven at a reduced speed in response to rotation of said motor output shaft and having an output end drivingly coupled to said mode select member; and (D) encoder means operative to sense each of the shift positions of the transmission and generate a plurality of electrical encoder signals respectively corresponding to and representative of the sensed shift position.

2. A shift apparatus according to claim 1 wherein:

(E) said encoder means includes an encoder wheel mounted on said speed reduction unit output shaft.

3. An apparatus according to claim 2 wherein:

(F) said encoder wheel is positioned within said speed reduction unit housing.

4. An apparatus according to claim 3 wherein:

(G) said encoder means further includes a pickup device carried by said speed reduction unit housing and arranged to selectively engage code indicia on said encoder wheel as said wheel rotates in response to actuation of said motor.

5. An apparatus according to claim 4 wherein:

(H) said speed reduction unit includes a worm gear on said motor output shaft and a worm wheel on said speed reduction unit output shaft driven by said worm gear; and (I) said encoder wheel is secured to a side face of said worm wheel.

6. An electric shift apparatus for use with a motor vehicle having an automatic transmission of the type including a mode select shaft to selectively shift a transmission between a plurality of shift positions, said apparatus comprising:

(A) a power module adapted to be mounted on the housing of the transmission proximate the mode select shaft and including an electric motor assembly having an output shaft adapted to be drivingly coaxially connected to the mode select shaft and encoder means operative to sense the shift position of the transmission and generate an encoder signal representative of the sensed shift position (B) a control module adapted to be mounted in the passenger compartment of the vehicle and including a plurality of mode select members accessible to the vehicle operator and corresponding respectively to the transmission shift positions, and generator means operative in response to operator actuation of each mode select member to generate an operator signal representative of the selected shift position; and (C) comparator means receiving said encoder signal and said operator signals, operative in response to receipt of an operator signal differing from the received encoder signal to energize said motor assembly in a sense to move the mode select shaft to a position corresponding to the operator signal, and operative in response to arrival of the mode select shaft in the selected position to deenergize said motor assembly.

7. An electric shift apparatus according to claim 6 wherein:
  (D) said comparator means forms a physical part of said control module.

8. An apparatus according to claim 7 wherein:
  (E) said control module includes a housing structure defining a front face;
  (F) each of said mode select members comprises a push-button mounted in said front face of said housing structure;
  (G) said generator means is operative to generate a respective operator signal in response to depression of a respective push-button; and
  (H) said comparator means are positioned in said housing structure rearwardly of said push-buttons.

9. An apparatus according to claim 6 wherein:
  (D) said motor assembly comprises an electric motor and a speed reduction unit coupled to the output shaft of said motor and having an output shaft constituting the output shaft of said motor assembly; and
  (E) said encoder means includes an encoder member mounted on said power module and selectively movable in response to actuation of said motor.

10. An apparatus according to claim 9 wherein:
  (F) said encoder member comprises an encoder wheel mounted on said output shaft of said speed reduction unit.

11. An apparatus according to claim 10 wherein:
  (G) said speed reduction unit includes a housing defining a sealed, interior chamber;
  (H) said encoder wheel is positioned within said chamber; and
  (I) said encoder means further includes a pickup device carried by said speed reduction unit housing and arranged to selectively engage code indicia on said encoder wheel as said wheel rotates in response to actuation of said motor.

12. An apparatus according to claim 11 wherein:
  (J) said speed reduction unit includes a worm gear on the output shaft of said motor and a worm wheel on the output shaft of the speed reduction unit driven by said worm gear; and
  (K) said encoder wheel is secured to a side face of said worm wheel.

13. In a motor vehicle of the type including an automatic transmission having a mode select shaft having a free end positioned outside of the transmission housing and operative in response to rotation thereof to selectively shift the transmission between a plurality of shift positions and operator controlled means for selectively rotating said shaft, the improvement wherein said operator controlled means comprises:
  (A) a power module adapted to be mounted on the housing of the transmission proximate the free end of the mode select lever and including an electric motor assembly including an output shaft adapted to be drivingly and coaxially coupled to the free end of the mode select shaft so as to rotate the mode select shaft in response to actuation of the motor;
  (B) a control module adapted to be mounted in the passenger compartment of the vehicle and including a plurality of mode select members accessible to the vehicle operator and including a separate mode select member for each transmission shift position, and generator means operative in response to operator actuation of each mode select member to generate an operator signal representative of the shift position; and
  (C) energizing means operative in response to receipt of said operator signals to energize said motor assembly in a sense and to a degree to move said mode select shaft to a position corresponding to the operator signal.

14. In a motor vehicle of the type including an automatic transmission having a mode select shaft having a free end positioned outside of the transmission housing and operative in response to rotation thereof to selectively shift the transmission between a plurality of shift positions and operator controlled means for selectively rotating said shaft, the improvement wherein said operator controlled means comprises:
  (A) a power module adapted to be mounted on the housing of the transmission proximate the free end of the mode select lever and including an electric motor assembly including an output shaft 12 adapted to be drivingly and coaxially coupled to the free end of the mode select shaft so as to rotate the mode select shaft in response to actuation of the motor;
  (B) a control module adapted to be mounted in the passenger compartment of the vehicle and including a plurality of mode select members accessible to the vehicle operator and corresponding respectively to the transmission shift positions, and generator means operative in response to operator actuation of each mode select member to generate an operator signal representative of the shift position; and
  (C) energizing means operative in response to receipt of said operator signals to energize said motor assembly in a sense and to a degree to move said mode select shaft to a position corresponding to the operator signal, said energizing means including
    (1) encoder means operative to sense the shift position of the transmission and generate an encoder signal representative of the sensed shift position, and
    (2) comparator means receiving said encoder signal and said operator signals, operative in response to receipt of an operator signal differing from the received encoder signal to energize said motor assembly in a sense to move the mode select shaft to a position corresponding to the operator signal, and operative in response to arrival of the mode select shaft in the selected position to deenergize said motor assembly.

15. A motor vehicle according to claim 14 wherein:
  (D) said motor assembly comprises an electric motor and a speed reduction unit coupled to the output shaft of said motor and having an output shaft constituting the output shaft of said motor assembly; and
  (E) said encoder means includes an encoder member mounted on said power module and selectively movable in response to actuation of said motor.

16. A motor vehicle according to claim 15 wherein:
  (F) said encoder member comprises an encoder wheel mounted on said output shaft of said speed reduction unit.

17. A motor vehicle according to claim 16 wherein:
  (G) said speed reduction unit includes a housing defining a sealed interior chamber;
  (H) said encoder wheel is positioned within said chamber; and (I) said encoder means further includes a pickup device carried by said speed reduction unit housing and arranged to selectively engage code indicia on said encoder wheel as said wheel rotates in response to actuation of said motor.

18. A motor vehicle according to claim 17 wherein:
(J) said speed reduction unit includes a worm gear on the output shaft of said motor and a worm wheel on the output shaft of said speed reduction unit driven by said worm wheel; and
(K) said encoder wheel is secured to a side face of said worm wheel.

19. In a motor vehicle of the type including an automatic transmission of the type including a mode select shaft to selectively shift the transmission between a plurality of shift position and operator controlled means for selectively rotating said shaft, the improvement wherein said operator controlled means includes:
(A) a power module adapted to be mounted on the housing of the transmission proximate the mode select shaft and including an electric motor assembly having an output shaft adapted to be drivingly connected to the mode select shaft;
(B) a control module adapted to be mounted in the passenger compartment of the vehicle and including a plurality of mode select members accessible to the vehicle operator and corresponding respectively to the transmission shift positions, and generator means operative in response to operator actuation of each mode select member to generate an operator signal representative of the selected shift position; and
(C) comparator means receiving said operator signals and encoder signals representative of the present shift position, operative in response to receipt of an operator signal differing from the received encoder signal to energize said motor assembly in a sense to move the mode select shaft to a position corresponding to the operator signal, and operative in response to arrival of the mode select shaft in the selected position to deenergize said motor assembly.

* * * * *

UNITED STATES PATENT AND TRADEMARK OFFICE
CERTIFICATE OF CORRECTION

PATENT NO. : 4,841,793

DATED : June 27, 1989

INVENTOR(S) : Leigh-Monstevens et al

It is certified that error appears in the above-identified patent and that said Letters Patent is hereby corrected as shown below:

Column 5, line 53, "MPH30" should be --MPH3--.

Column 6, line 10, "PPD" should be --PDD--.

Signed and Sealed this

Thirteenth Day of November, 1990

Attest:

HARRY F. MANBECK, JR.

*Attesting Officer*  *Commissioner of Patents and Trademarks*